July 12, 1949.
C. E. BAIRD
2,475,585
EXCESS FLOW VALVE
Filed June 9, 1945
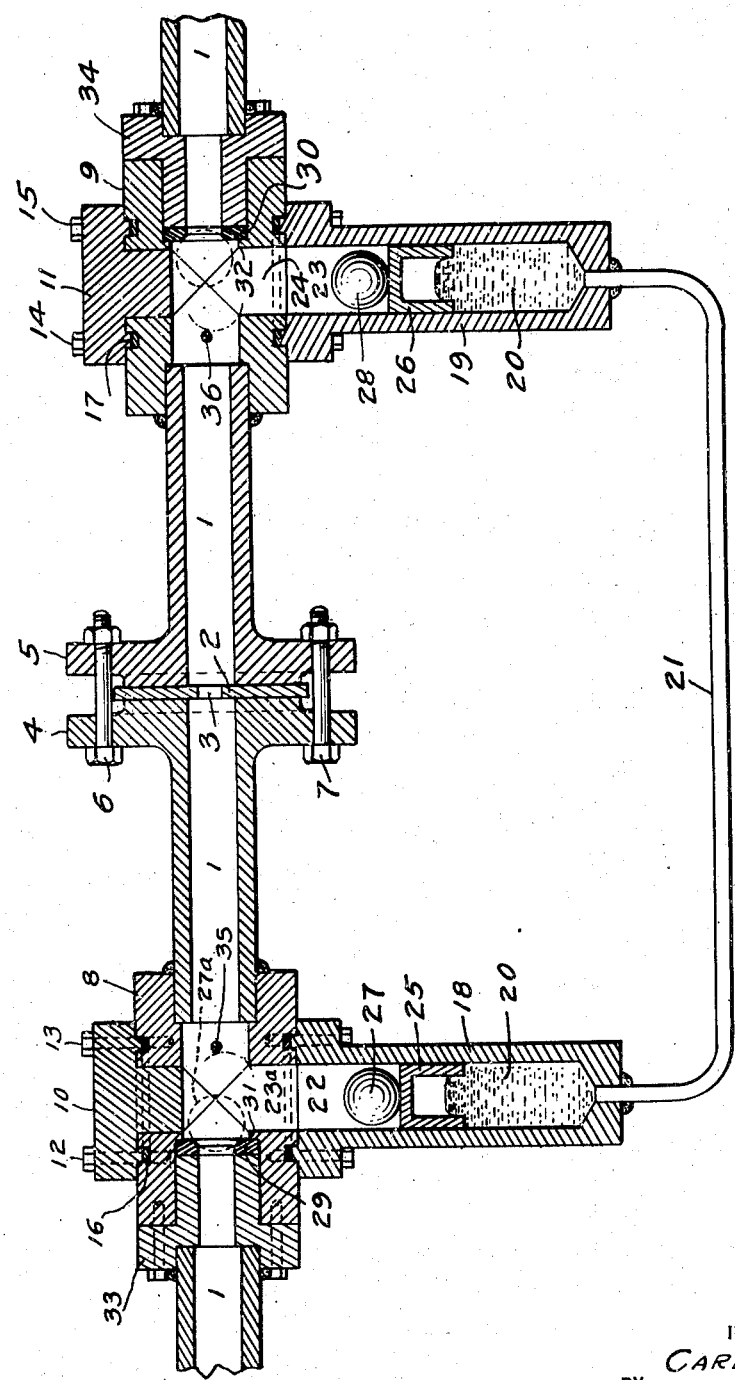
INVENTOR
CARL E. BAIRD
BY
ATTORNEY Patented July 12, 1949

2,475,585

UNITED STATES PATENT OFFICE 2,475,585

EXCESS FLOW VALVE

Carl E. Baird, Otis, Kans.

Application June 9, 1945, Serial No. 598,483

2 Claims. (Cl. 137—153)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provision of the act of April 30, 1928 (Ch. 460, 45 Stat. L. 467).

This invention relates to excess-flow valves, and more particularly to an excess flow valve operating upon the differential pressure principle.

Heretofore, numerous attempts have been made to secure a valve which will close off fluid flow in a conduit upon the attainment of a predetermined maximum or excessive rate of flow, such as might be caused by leakage of fluid from or rupture of the conduit. However, most of these attempts to provide a suitable excess-flow valve involved the use of complicated electrical circuits or elaborate mechanical linkages which were difficult to construct, operative only for one direction of flow, could not be adjusted for varying rates of flow, or required the services of skilled mechanics in operation.

This invention accordingly has for its object the provision of a simple, reliable excess-flow valve which is operative both for forward and reverse flows, can readily be adjusted to operate at any desired rate of flow, is fully automatic in operation, and which is adapted for use in both high and low pressure conduits. Other objects will be apparent or will appear hereinafter as the ensuing description proceeds.

The foregoing objects are accomplished in accordance with this invention which provides a conduit including means for generating a pressure differential responsive to fluid flow between adjacent portions thereof, and hydraulically-actuated closure means connected to said conduit on each side of said differential pressure generating means to close off fluid flow in said conduit upon attainment of a predetermined maximum pressure differential.

The invention will be made clear by reference to the ensuing description taken in conjunction with the accompanying drawing, wherein is illustrated a sectional view of an excess flow-valve in accordance with this invention.

For a practical embodiment of the invention, and referring to the drawing, a suitable conduit I adapted to contain and transfer a fluid, is provided with suitable means for generating a pressure differential between adjacent portions thereof, responsive to fluid flow therein. Such means may take the form of a diaphragm 2 positioned transversely across the conduit I, and having an orifice 3 in the line of flow in the conduit I, as shown. The diaphragm 2 is shown retained in the conduit I between two flanged portions 4 and 5, which are in turn drawn together in fluid-tight engagement by suitable bolts 6 and 7. The orifice 3 in the diaphragm 2 is made of sufficiently-smaller size than the conduit I as to restrict fluid flow therethrough, thus generating a pressure differential during fluid flow in the conduit I across the diaphragm 2 in accordance with well-known principles of physics. However, in order not unduly to restrict normal fluid flow through the conduit I, the orifice 3 is made as large as possible while still providing the pressure differential at excess flow rates to operate the closure means later to be described. As shown, the diaphragm 2 is readily removable merely by loosening the bolts 6 and 7, removing the diaphragm 2 and inserting a new diaphragm 2 having a different sized orifice 3. Thus for any excess rate of flow at which it is desired to cut off the conduit flow, a diaphragm 2 having a suitably sized orifice 3 to generate the necessary differential pressure can be inserted or replaced.

Suitable hydraulically-actuated closure means are connected to the conduit I to respond to the differential pressure created or generated by the diaphragm 2 in the conduit I so that upon attainment of any desired maximum fluid flow the closure means become operative to shut off fluid flow and thereafter remain operative in response to fluid pressure alone to maintain a substantially fluid-tight seal in the conduit I. As shown, such closure means may take the form of a pair of valve housings 8 and 9 in the conduit I on each side of the diaphragm 2 adjacent thereto. The housings 8 and 9 are fitted with inspection caps 10 and 11 connected to the housings 8 and 9 by bolts 12, 13, 14 and 15 for providing access to the interior mechanism in the housings 8 and 9 and to permit adjustment in the hydraulic liquid level later to be described.

Packing material 16 and 17 between the valve housings 16 and 17 and the caps 10 and 11 such as asbestos, oakum, lead or the like, provides a fluid-tight joint between the caps 10 and 11 and the housings 8 and 9.

Depending from the housings 8 and 9 and extending in substantially perpendicular alignment to the axis of the conduit I are a pair of elongated float chambers 18 and 19 adapted to contain a hydraulical-actuating fluid, such as mercury or any similar liquid which is immiscible with, inert to, and has a higher density than the fluid normally carried by the conduit I. Preferably, the float chambers 18 and 19 are in vertical alignment and detachably bolted to the housings 8 and 9, as shown. Connecting the float chambers 18 and 19 below the low liquid level thereof, preferably at the bottom as shown, is a pipe 21 for equalizing the pressure in the chambers 18 and 19 by transport of hydraulic fluid from the chamber at the higher pressure to the chamber at the lower pressure, in either direction of flow, as the case may be. The float chambers 18 and 19 are provided with elongated bores 22 and 23 opening upwardly into similarly aligned bores 23a and 24 in the housings 8 and 9 forming extensions of the float chamber bores 22 and 23. In the float chambers 18 and 19 are a pair of floats 25 and 26 supporting a pair of ball valves 27 and 28 adapted to move upwardly and downwardly responsive to a change in the level of the hydraulic fluid 20.

In the valve housings 8 and 9 adjacent the bores 23a and 24 on the far sides thereof relative to the diaphragm 2, are a pair of valve seats 29 and 30 resting against a pair of shoulders 31 and 32 formed in the housings 8 and 9 concentrically with the axis of the conduit 1. A pair of annular retaining members 33 and 34, connecting the exterior portions of the conduit 1 with the housings 8 and 9 coaxial with the conduit 1, serve to hold the valve seats 29 and 30 in place against the shoulders 31 and 32. Optionally, a pair of pins 35 and 36 in the housings 8 and 9 on the diaphragm sides of the bores 23a and 24 prevent retraction of the ball valves 27 and 28 into the conduit 1 toward the diaphragm 2.

In the operation of a device in accordance with the invention, a diaphragm 2 having a suitably sized orifice 3 relative to the normal and excess fluid flows in the conduit 1 is inserted in position and the bolts 6 and 7 are tightened to make a fluid-tight seal.

The inspection caps 10 and 11 are removed and a sufficient quantity of mercury or other suitable hydraulic fluid is poured into one of the chambers 18 and 19 so that the floats 25 and 26 normally support the ball valves 27 and 28 in the bores 22 and 23 out of the line of flow in the conduit 1 through the housings 8 and 9. However, the normal liquid level in the chambers 18 and 19 is made sufficiently high in the bores 22 and 23 so that upon excessive fluid flow in the conduit 1 the differential pressure generated by the orifice 3 will elevate one of the ball valves 27 and 28 into conduit-closing engagement with one of the valve seats 29 and 30. Ordinarily, the liquid level in the chambers 18 and 19 is made as high as possible without normally obstructing the conduit 1 with the ball valves 27 and 28, and the orifice 3 in the diaphragm 2 is made as large as possible in order that the fluid flow may be restricted only slightly during normal operation.

After insertion of hydraulic fluid, the floats 25 and 26 are placed in position to prevent contamination of hydraulic fluid, and the ball valves 27 and 28 are placed in the bores 22 and 23 on the floats 25 and 26. The caps 10 and 11 are replaced, the bolts 12, 13, 14 and 15 are tightened, and fluid flow is started through the conduit 1. Upon normal fluid flow, some differential pressure is generated across the diaphragm 2, and hydraulic fluid is transferred through the pipe 21 to the low-pressure float chamber 18 and 19 until the pressures are equalized, but the liquid level in the low pressure chamber 18 or 19 is not high enough to elevate the low pressure ball valve into the conduit-closure position.

Upon excessive fluid flow in the conduit 1 the orifice 3, in partially restricting fluid flow in the conduit 1, creates a low pressure on the side of the diaphragm 2 which is away from the source of fluid, that is to say, which is closest to the delivery point when the conduit is substantially straight.

The low pressure in the conduit 1 thus acts on the hydraulic fluid 20 in the valve chamber 18 or 19. Mercury or other hydraulic fluid 20 flows from the valve chamber 18 or 19 on the high pressure side of the diaphragm 2 through the pipe 21 to the low-pressure valve chamber 18 or 19, until the difference in hydrostatic heads between the two valve chambers 18 or 19 balances the impressed pressure differential. Upon filling the low-pressure chamber, for example 18, the float 25 then elevates the ball valve 27 into the bore 23a into cooperative conduit-sealing engagement with the valve seat 29 and fluid flow through the conduit 1 is shut off. Thereupon, the pressure difference across the ball valve 27a retains it in conduit-sealing engagement. Upon release of pressure in the conduit 1 the ball valve 27 falls back into the bore 22, being optionally prevented from retraction in the conduit 1 by the transverse pin 35. The valve device of this invention thus automatically resets itself. Upon an excess fluid flow in the reverse direction, the operative cycle is repeated employing the other valve chamber 19 as the low-pressure closure device similar to the operative cycle above described.

From the foregoing, it is apparent that the invention herein described provides a simple and readily adjustable excess flow valve operative for both forward and reverse flows. It is hydraulically actuated, and thus obviates the necessity for complicated mechanical movements or electrical circuits. By virtue of its simplicity, my device is adapted both for high and low pressure conduits, and is adjustable for any normal fluid flow.

A wide variety of hydraulic fluids can be employed as an operating liquid in my device, and although mercury is preferred because of its density, inertness, and low viscosity, nevertheless any slightly-volatile liquid can be employed, such as castor oil, liquid petrolatum and the like, in accordance with the criteria previously set forth.

Any fluid such as water, petroleum, brines and the like, which is less dense than the operating liquid and substantially inert thereto, can be transported or conveyed through conduits equipped with my excess flow valve, but my invention is especially adapted for installation on conduits carrying gaseous fluids, such as natural gas, hydrogen, nitrogen and the like.

It will be apparent that various changes will occur to one skilled in the art, and such changes can be made without departing from the spirit and scope of my invention.

What is claimed is:

1. In apparatus of the class described, a horizontally-aligned fluid conduit including flow-restricting means therein for generating a pressure differential thereacross upon movement of fluid in said conduit, a pair of vertically-aligned float chambers connected with said conduit on opposite sides of said flow-restricting means and adapted to contain a liquid of greater specific gravity than that transported in the conduit, means connecting said float chambers to balance the total pressures therein, a pair of valve members, respectively normally supported in each of said chambers out of said conduit, but adapted for movement upwardly into the line of flow, and a pair of oppositely-facing valve seats in said conduit coaxial therewith adjacent said float chambers, whereby upon attainment of a predetermined maximum pressure differential a valve member will move upwardly into conduit-closing engagement with a valve seat.

2. In apparatus of the class described, a horizontally-aligned fluid conduit including a diaphragm having an orifice therein of a size restricting fluid flow in said conduit for generating a pressure differential across said diaphragm upon movement of fluid, a pair of vertically-aligned float chambers adapted to contain a liquid connected with said conduit on opposite sides of said diaphragm, a pipe connecting said float chambers to balance the pressures therein, a spherical valve member in each float chamber adapted to be elevated into the line of flow in said conduit by a predetermined difference in the hydrostatic heads in the respective float chambers induced by flow in excess of a predetermined value in said conduit, a float in each chamber supporting said member and adapted to prevent contamination of contained liquid, and a pair of valve seats in said conduit one on each side of said diaphragm adjacent said chambers, each valve seat being adapted to receive a spherical valve member in conduit-closing engagement upon elevation of said member into the line of flow in said conduit..

CARL E. BAIRD.

REFERENCES CITED

The following references are of record in the file of this patent:

UNITED STATES PATENTS

| Number | Name | Date |
| --- | --- | --- |
| 1,518,461 | Smith | Dec. 9, 1924 |
| 2,012,351 | Riney | Aug. 27, 1935 |